N. A. WHEELER.
CHAIN DRIVE COUPLING.
APPLICATION FILED JULY 19, 1915.

1,193,098.

Patented Aug. 1, 1916.

WITNESSES:
Charles Pickles
Thos Castberg

INVENTOR
Nelson A. Wheeler.
BY Strong & Townsend
ATTORNEYS

UNITED STATES PATENT OFFICE.

NELSON A. WHEELER, OF STOCKTON, CALIFORNIA, ASSIGNOR TO THE HOLT MANUFACTURING COMPANY, OF STOCKTON, CALIFORNIA, A CORPORATION OF CALIFORNIA.

CHAIN-DRIVE COUPLING.

1,193,098.

Specification of Letters Patent. Patented Aug. 1, 1916.

Application filed July 19, 1915. Serial No. 40,558.

*To all whom it may concern:*

Be it known that I, NELSON A. WHEELER, a citizen of the United States, residing at Stockton, in the county of San Joaquin and State of California, have invented new and useful Improvements in Chain-Drive Couplings, of which the following is a specification.

This invention relates to drive chains and pertains especially to couplings for detachable drive chains.

The object of the invention is to provide a simple, practical spring steel locking latch or key to retain and secure the removable transverse pivot pin or coupling bar, connecting the sides of the links of a detachable drive chain. These chains often require adjustment, an operation which involves the uncoupling of the chain by the withdrawal of the removable pivot or coupling pin of the cross bar.

In carrying out my invention I provide a locking latch which is permanently secured to the side of the link by means of a pivot passing therethrough, and through the side bar of the link, and a friction plate or washer that is held against the link by means of the riveted head of the pivot on the inner side of the link; the outer or locking end of the latch passing within a slot or groove near the outer end of the removable coupling cross bar, while the longer yielding end of the latch is provided with a holding aperture that encircles the head of the non-removable coupling bar or pin at the opposite end of the link, thus holding the latch lock in place; the elasticity of the latch at this point admitting its flexing for this purpose.

The invention consists of the parts and the combination and construction of parts as hereinafter more fully described and claimed, having reference to the accompanying drawings, in which—

Figure 1:
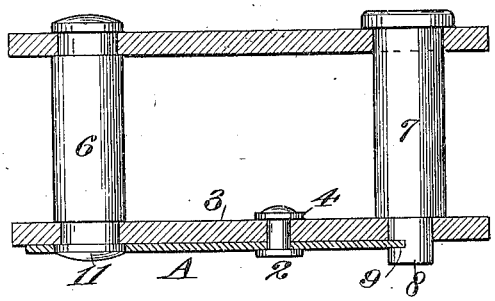
Figure 2:
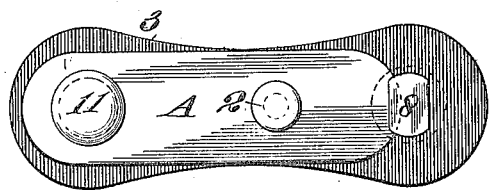
Figure 3:
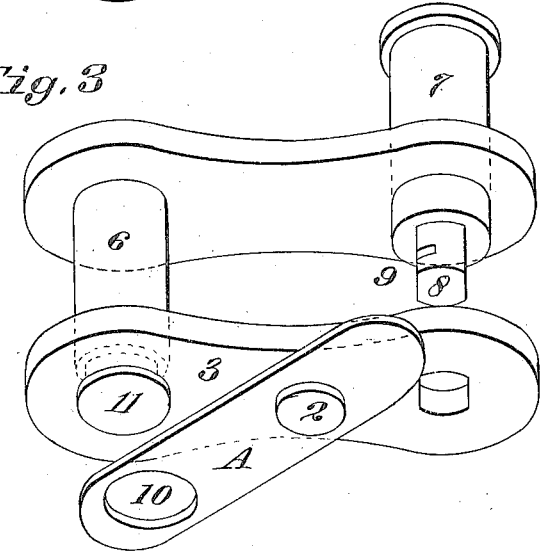

Figure 1 is a longitudinal sectional view of a removable link of the drive chain, showing the latch or key locked in operative position. Fig. 2 is a side elevation of the same. Fig. 3 is a perspective view of the link with the latch detached permitting the removal of the coupling pin, and disconnection of the chain link.

A represents a spring steel locking latch or key pivoted between its ends by the treaded rivet 2 passing through a side bar of the link 3; 4 is a friction plate or washer on the inner side of the link.

The link comprises two side bars adapted to pivot at one end on the link pin 6 and to be detachably connected at the other end by removable coupling pin or cross bar 7. Bar 7 is of reduced diameter at the outer end to allow it to pass the smaller hole in the side bar to which the latch member A is attached; the main body of the pin shouldering against said side bar after having been passed through the outer side bar of the link. The reduced end 8 of pin 7 outside of the side bar carrying latch A has a transverse notch 9 to receive one end of the latch A when the parts are in assembled position, and so lock the pin 7 against removal; the position of notch 9 being such as to permit the spring latch to lie flat against its side bar. The other end of spring latch A has an eye 10 to slip over the protruding head 11 of pin 6 and so prevent accidental pivotal unlocking movement of the latch.

To uncouple the link it is only necessary to lift the end of the latch which fits over the projection 11 and turn it to disengage notch 9 and then withdraw pin or bar 7.

It will be seen that the driving chain is easily assembled or uncoupled without the use of tools or other parts, the same being practically a complete whole, and the link will not become loose or displaced by the operation of the chain or sprocket wheels that actuate it.

The advantages and simplicity of my construction, as shown, are obvious to those skilled in the art to which it relates, as it will be seen that its economy of construction, and security in use, make it much more desirable than present forms; as in coupling and uncoupling, the mere pressure of the thumb operates the latch, which is securely held in operative position at all times, and is not liable to get lost or misplaced under any conditions, and retains its locking function most securely, as the chain revolves rapidly, and cannot be jarred out of place.

Having thus described my invention, what I claim and desire to secure by Letters Patent is—

1. A drive chain coupling comprising spaced side plates, a pin fixedly connecting the plates and projecting outwardly from one plate, a removable pin connecting the plates and projecting from the specified plate, the projecting end of the removable pin being slotted, and a flexible plate pivoted directly to the specified side plate having the extremity of one end engageable in the slotted end of the removable pin and its opposite end apertured to receive the projecting end of the fixed pin.

2. A drive chain coupling comprising spaced side plates, a pin fixedly connecting the plates and projecting outwardly from one plate, a removable pin connecting the plates and provided with a flattened end projecting through the specified side plate, said projecting flattened end being slotted, and a flexible locking plate pivoted to the specified side plate for swinging to either side of the projecting pins said locking plate engaging in the slot of the removable pin and interlocking with the projecting end of the fixed pin.

3. A drive chain coupling comprising spaced side plates, a pin fixedly connecting the plates and projecting outwardly from one plate, a removable pin connecting the plates and having a projecting end slotted, and a flexible locking plate having its end passable through the slot of the removable pin and pivoted to the specified side plate for swinging to either side thereof.

4. A drive chain coupling comprising a pair of side plates one of which has a flat-sided opening, a pin removably carried by the other plate and formed with a flat-sided end portion passing through the opening of the first side plate, said projecting end being slotted in its flat side, a locking plate pivoted to swing to either side of the projecting end and passable through the slot of the latter, and a second pin fixedly connecting the side plates.

5. A drive chain coupling comprising a pair of side plates one of which has a flat-sided opening, a pin removably carried by the other plate and formed with a flat-sided end portion passing through the opening of the first side plate, said projecting end being slotted, a second pin connecting the plates and providing a rounded head projecting from the first plate, and a locking plate pivoted to the first plate between the projecting ends of the pins, said locking plate having one end engageable in the slot of the first pin and the opposite end apertured to pass over the head of the second pin and embrace the latter.

In testimony whereof I have hereunto set my hand in the presence of two subscribing witnesses.

NELSON A. WHEELER.

Witnesses:
A. B. HOLT,
H. E. THRELFALL.

Copies of this patent may be obtained for five cents each, by addressing the "Commissioner of Patents, Washington, D. C."